(12) United States Patent
Floeder et al.

(10) Patent No.: US 9,977,613 B2
(45) Date of Patent: May 22, 2018

(54) SYSTEMS AND METHODS FOR ZONE PAGE ALLOCATION FOR SHINGLED MEDIA RECORDING DISKS

(71) Applicant: Dell Products L.P., Round Rock, TX (US)

(72) Inventors: Anthony Floeder, St. Anthony, MN (US); Michael J. Klemm, Minnetonka, MN (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 14/984,198

(22) Filed: Dec. 30, 2015

(65) Prior Publication Data

US 2017/0192696 A1    Jul. 6, 2017

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC .... G06F 3/0613; G06F 3/0619; G06F 3/0631; G06F 3/0664; G06F 3/0665; G06F 3/0689

USPC .................................................. 711/5, 114
See application file for complete search history.

(56) References Cited

U.S. PATENT DOCUMENTS

| | | | |
|---|---|---|---|
| 2007/0043771 A1* | 2/2007 | Ludwig | H04L 61/1582 |
| 2011/0191537 A1* | 8/2011 | Kawaguchi | G06F 3/0605 711/114 |
| 2015/0363126 A1* | 12/2015 | Frick | G06F 1/3203 711/114 |

* cited by examiner

*Primary Examiner* — Gary Portka
(74) *Attorney, Agent, or Firm* — Jackson Walker L.L.P.

(57) ABSTRACT

In accordance with embodiments of the present disclosure, a disk drive system may include a RAID subsystem comprising a pool of storage and a disk manager having at least one disk storage system controller. The at least one disk system controller may be configured to create a plurality of zones in the pool of storage, each zone comprising a plurality of stripes, each of the plurality of stripes striped across all of the physical disks within a logical disk comprising the zone, and manage pages of write input/output operations in order to group pages of write input/output operations together within the plurality of stripes of a zone.

21 Claims, 5 Drawing Sheets

SYSTEMS AND METHODS FOR ZONE PAGE ALLOCATION FOR SHINGLED MEDIA RECORDING DISKS

TECHNICAL FIELD

The present invention generally relates to a disk drive system and method, and more particularly to systems and methods for zone page allocation for shingled media recording disks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In this regard, RAID, an acronym for Redundant Array of Independent Disks, is a technology that provides increased storage functions and increased reliability through redundancy, and as such may be beneficially employed in information handling systems. Redundancy in a RAID device may be achieved by combining multiple disk drive components, which may include one or more disks of different type, size, or classification, into a logical unit, where data is distributed across the drives in one of several ways called "RAID levels." The data distribution determines the RAID type, e.g., RAID 0, RAID 5, RAID 10, etc.

RAID includes data storage schemes that can divide and replicate data among multiple physical disk drives. The physical disks are said to be in a RAID array, which is addressed by the operating system as one single disk. Many different schemes or architectures of RAID devices are known to those having ordinary skill in the art. Each different architecture or scheme may provide a different balance among various goals to be achieved in storing data, which include, but are not limited to, increased data reliability and increased input/output (hereinafter "I/O") performance.

Storage systems may use disk drives comprising shingled media recording (SMR) disks. As known in the art, SMR disks may record data using overlapping write tracks. Physical characteristics of the disk heads may result in the write head being larger than the read head. This overlapping nature of writes often requires that a zone be written from beginning to end to avoid destroying the data on surrounding tracks.

From a disk management point-of-view, SMR makes random access writes perform poorly or not at all depending on the variety of SMR disk. SMR disks do not perform well with fully random write workloads. I/O initiators must control the write pattern to maximize performance for both writes and reads.

SMR disks may incur write amplification when a portion of the data is written within a zone. Unmodified data within the zone must move and be re-written in order for a zone to be written. Such write amplification consumes resources of a disk, the storage connection, and/or the memory bandwidth of a disk controller. Ideally, write amplification occurs within a disk. Write amplification at the connection (e.g., Serial Attached Small Computer System Interface connection) and controller level may limit overall system performance when new data replaces old data in zones. For example, for RAID 6, write amplification sizes may approach a zone size (e.g., 256 MB) times the number of disks in a RAID stripe (e.g., 10 for RAID 6-10 disks). Thus, updating a small amount of data may require the movement of over 2 GB of data to update each data disk in a stripe plus any parity data. Thus, it may be desireable to isolate write amplification within a system to allow for scalability and provide for the best overall system performance.

Existing approaches for zone alignments in a storage system do not take into account SMR zones or the effect of write amplification. Stripes under existing approaches, and therefore page alignments under existing approaches, may spread out across a wide set of disks to maximize parallelism for concurrent requests. Sequential page numbers may likely use a completely different set of disks. Also within any number of disks supported in a RAID configuration, sequential pages on a disk may not be the same for other disks in the stripe. Such alignment makes it difficult to determine adjacent pages on SMR disks. RAID stripe alignments must allow for a simple determination of adjacent pages within a zone.

Existing disk management approaches may allocate pages assuming that all pages may be equally written at any time. In other words, such approaches may assume full random write access to any page at any time. However, SMR disks may require grouped or sequential writes to maximize performance capabilities. A disk management system, therefore, must control page allocations and writes must occur in a coordinated manner to effectively use SMR disks.

SUMMARY

In accordance with the teachings of the present disclosure, the disadvantages and problems associated with existing approaches to data storage may be substantially reduced or eliminated.

In accordance with embodiments of the present disclosure, a method may include creating a plurality of zones in a storage system comprising a plurality of physical disks, each zone comprising a plurality of stripes, each of the plurality of stripes striped across all of the physical disks within a logical disk comprising the zone. The method may also include managing pages of write input/output operations in order to group pages of write input/output operations together within the plurality of stripes of a zone.

In accordance with these and other embodiments of the present disclosure, a disk drive system may include a RAID subsystem comprising a pool of storage and a disk manager having at least one disk storage system controller. The at least one disk system controller may be configured to create a plurality of zones in the pool of storage, each zone comprising a plurality of stripes, each of the plurality of stripes striped across all of the physical disks within a logical disk comprising the zone, and manage pages of write input/output operations in order to group pages of write input/output operations together within the plurality of stripes of a zone.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (i) create a plurality of zones in a storage system comprising a plurality of physical disks, each zone comprising a plurality of stripes, each of the plurality of stripes striped across all of the physical disks within a logical disk comprising the zone; and (ii) manage pages of write input/output operations in order to group pages of write input/output operations together within the plurality of stripes of a zone.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
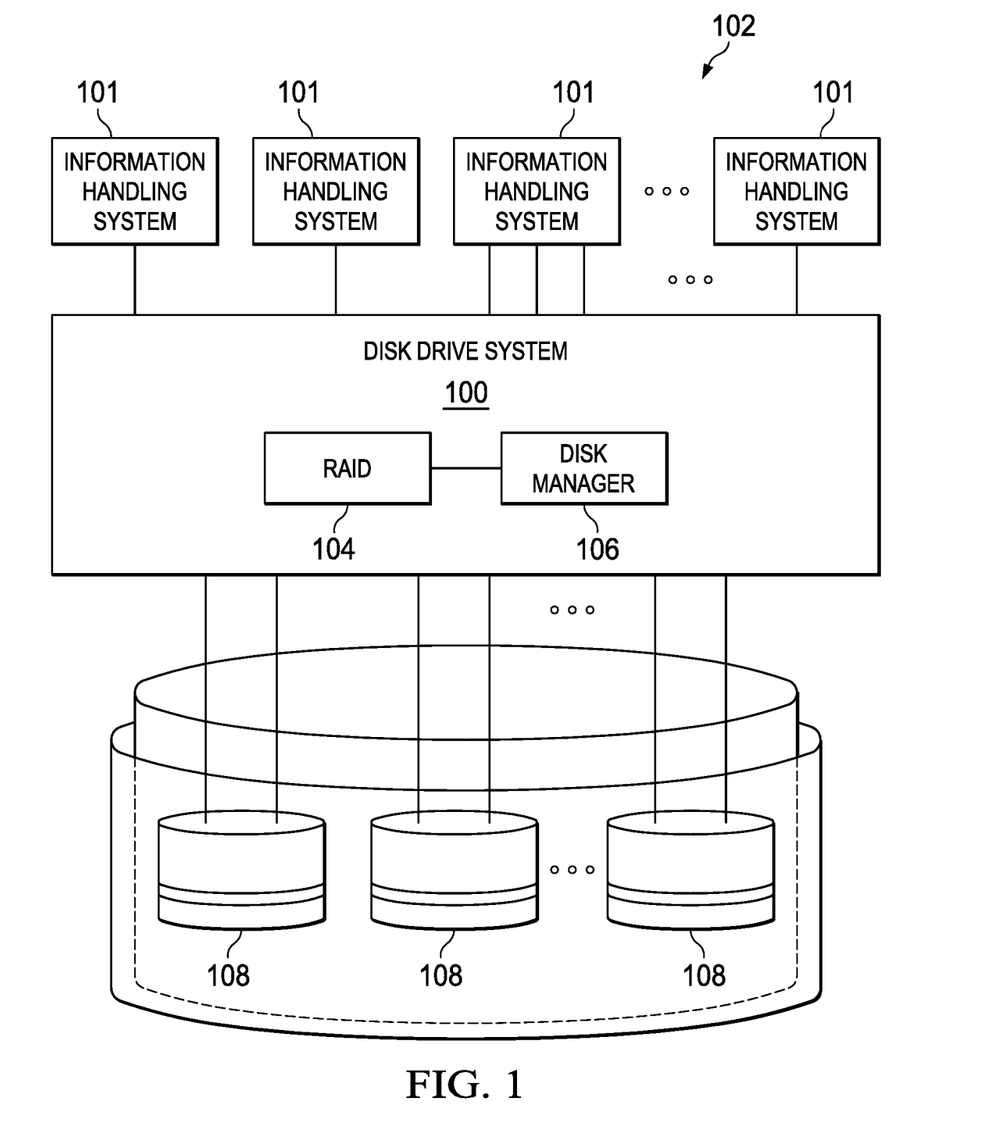
FIG. 1 illustrates a block diagram of an example disk drive system in an information handling system, in accordance with the embodiments of the present disclosure.

FIG. 1 illustrates a block diagram of an example disk drive system 100 in an information handling system environment 102, in accordance with embodiments of the present disclosure. As shown in FIG. 1, environment 102 may include one or more information handling systems 101 communicatively coupled to disk drive system 100. In some embodiments, an information handling system 101 may comprise a personal computer. In some embodiments, an information handling system 101 may comprise or be an integral part of a server. In other embodiments, an information handling system 101 may comprise a portable information handling system (e.g., a laptop, notebook, tablet, handheld, smart phone, personal digital assistant, etc.).

As shown in FIG. 1, disk drive system 100 may include a RAID subsystem 104 and a disk manager 106 having at least one disk storage system controller. Disk manager 106, as shown in FIG. 1, may generally manage disks and disk arrays, including grouping/resource pooling, abstraction of disk attributes, formatting, addition/subtraction of disks, and tracking of disk service times and error rates. Disk manager 106 may distinguish the differences between various models of disks, and presents a generic storage device for the RAID component. Disk manager 106 may also provide grouping capabilities which facilitate the construction of RAID groups with specific characteristics such as 10,000 RPM disks, etc.

Thus, in embodiments of the present disclosure, the function of disk manager 106 may be at least three-fold: abstraction, configuration, and input/output (I/O) optimization. Disk manager 106 may present "disks" to upper layers which could be, for example, locally or remotely attached physical disk drives, or remotely attached disk systems. The common underlying characteristic is that any of these physical storage devices (e.g., disk drives 108) could be the target of I/O operations. The abstraction service of disk manager 106 may thus provide a uniform data path interface for the upper layers, particularly the RAID subsystem, and/or may provide a generic mechanism for the administrator to manage target devices (e.g., disk drives 108).

Disk manager 106 may also provide disk grouping capabilities to simplify administration and configuration. Disks can be named, and placed into groups, which can also be named. Grouping may be a powerful feature which simplifies tasks such as migrating volumes from one group of disks to another, dedicating a group of disks to a particular function, specifying a group of disks as spares, etc.

Disk manager 106 may also interface with devices, such as a Small Computer System Interface (SCSI) device subsystem which may be responsible for detecting the presence of external storage devices. Such a SCSI device subsystem may be capable, at least for Fibre Channel/SCSI/Serial-Attached SCSI (SAS) type devices, of determining a subset of devices which are block-type target storage devices. It is these devices which may be managed and abstracted by disk manager 106. In addition, disk manager 106 may be responsible for responding to flow control from a SCSI device layer. Accordingly, disk manager 106 may have queuing capabilities, which may present the opportunity to aggregate I/O requests as a method to optimize the throughput of disk drive system 100.

Furthermore, disk manager 106 may manage one or more disk storage system controllers. In some embodiments, a plurality of redundant disk storage system controllers may be implemented to cover the failure of an operating disk storage system controller. Redundant disk storage system controllers may also be managed by disk manager 106.

Disk manager 106 may interact with several other subsystems. For example, RAID subsystem 104 may be the major client of the services provided by disk manager 106 for data path activities. RAID subsystem 104 may use disk manager 106 as an exclusive path to disks 108 for I/O. RAID system 104 may also listen for events from disk manager 106 to determine the presence and operational status of disks 108. RAID subsystem 104 may also interact with disk manager 106 to allocate extents for the construction of RAID devices. In some embodiments of the present disclosure, RAID subsystem 104 may include a combination of at least one RAID type, such as RAID-0, RAID-1, RAID-5, and RAID-10. It will be appreciated that other RAID types can be used in alternative RAID subsystems, such as RAID-3, RAID-4, and RAID-6, etc.

Disk manager 106 may also utilize services of the SCSI device layer to learn of the existence and operational status of block devices, and may have an I/O path to these block devices. Disk manager 106 may query the SCSI device subsystem about devices as a supporting method to uniquely identify disks.

In operation, RAID subsystem 104 and disk manager 106 may dynamically allocate data across disk space of a plurality of disk drives 108 based on RAID-to-disk mapping. In addition, RAID subsystem 104 and disk manager 106 may be capable of determining whether additional disk drives are required based on the data allocation across disk space. If the additional disk drives are required, a notification may be sent to a user so that additional disk space may be added if desired.

Figure 2:
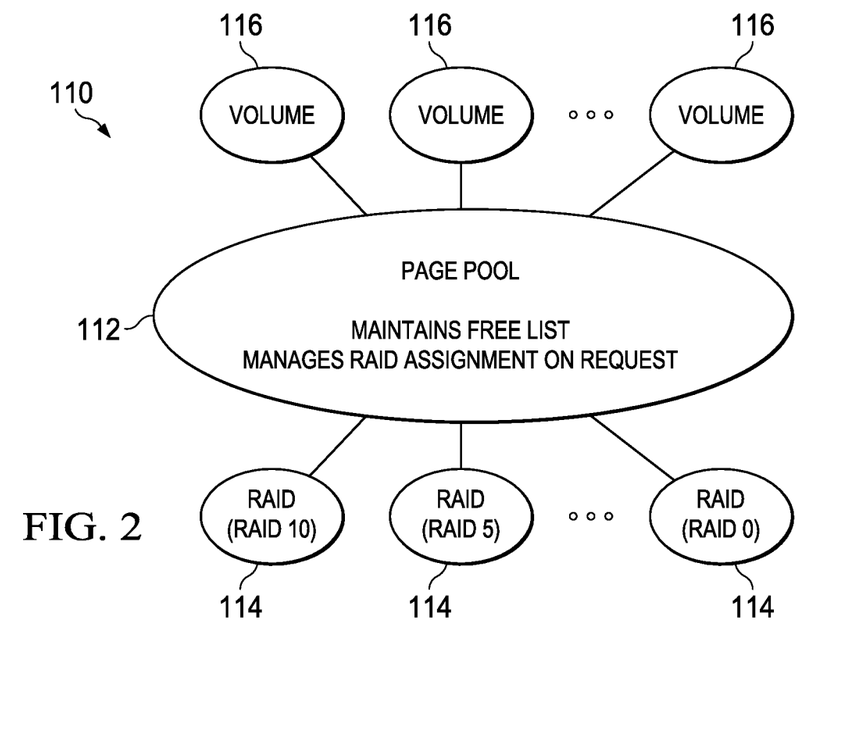
FIG. 2 illustrates a block diagram of an example dynamic data allocation having a page pool of storage for a RAID, in accordance with the embodiments of the present disclosure.

Disk drive system 100 may have a dynamic data allocation (referred to "disk drive virtualization") in accordance with the present disclosure. FIG. 2 illustrates a block diagram of an example dynamic data allocation having a page pool 112 of storage for a RAID, in accordance with the embodiments of the present disclosure. As shown in FIG. 2, disk storage system 110 may include a page pool of storage 112, e.g., a pool of data storage including a list of data storage space that is free to store data. Page pool 112 may maintain a free list of RAID devices 114 and may manage read/write assignments based on user's requests. User's requested data storage volumes 116 may be sent to the page pool 112 in order to obtain storage space responsive to such requests. Each volume 116 may request same or different classes of storage devices with same or different RAID levels, e.g., RAID 10, RAID 5, RAID 0, etc.

Figure 3A:
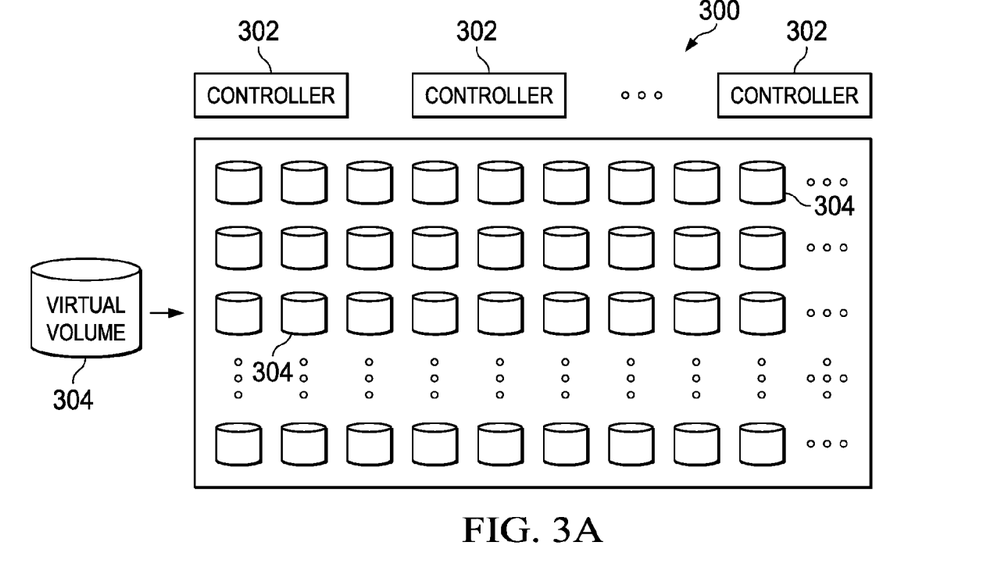
FIG. 3A illustrates a block diagram of an example disk drive system having a virtual volume matrix of disk storage blocks for dynamically allocating data in the system, in accordance with the embodiments of the present disclosure.
Figure 3B:
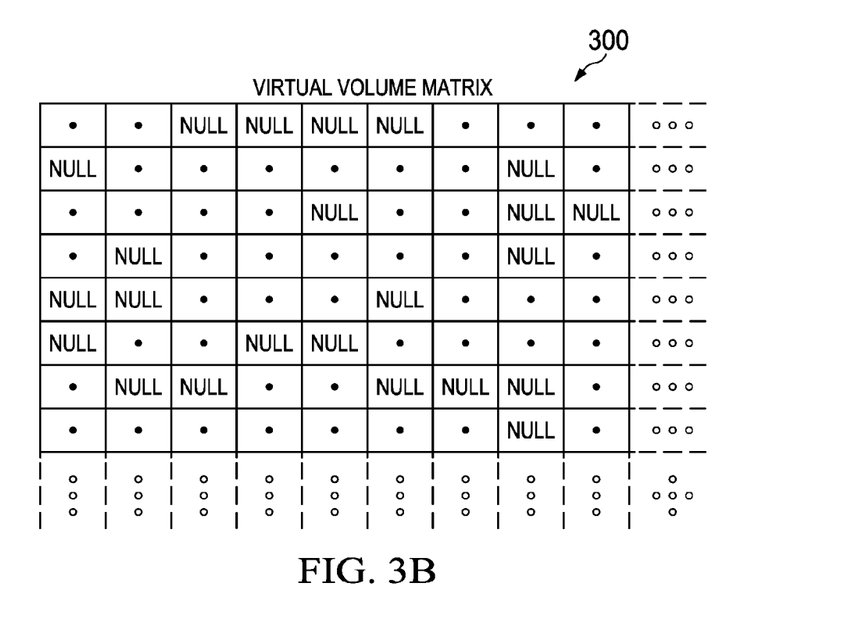
FIG. 3B illustrates a block diagram of example dynamic data allocation in the virtual volume matrix of disk storage blocks as shown in FIG. 3A, in accordance with the embodiments of the present disclosure.

FIG. 3A illustrates a block diagram of an example disk drive system having a virtual volume matrix of disk storage blocks for dynamically allocating data in the system, and FIG. 3B illustrates a block diagram of example dynamic data allocation in the virtual volume matrix of disk storage blocks as shown in FIG. 3A, in accordance with the embodiments of the present disclosure. As shown in FIGS. 3A and 3B, a disk storage system 300 having a plurality of disk storage system controllers 302 and a matrix of disk storage blocks 304 controlled by the plurality of disk storage system controllers 302 may dynamically allocate data in the system. Matrix of disk storage blocks 304 may be provided to associate with physical disks. Matrix of disk storage blocks 304 may be monitored/controlled dynamically by the plurality of disk storage system controllers 302. In one embodiment, the size of each disk storage block 304 may be predefined, for example two megabytes, and the location of each disk storage block 304 may default as null. Each disk storage block 304 may be null until data is allocated. The data can be allocated in any grid of the matrix or pool (e.g., a "dot" in the grid once data is allocated in the grid). Once the data is deleted, the disk storage blocks 304 may again be available as indicated to be "null." Thus, extra and sometimes expensive data storage devices, e.g., RAID devices, can be acquired later in time on a need basis.

Accordingly, RAID subsystem 104 is capable of employing RAID techniques across a virtual number of disks. The remaining storage space is freely available. Through monitoring storage space and determining occupancy rate of the storage space of the RAID subsystem, a user may not need to acquire a large sum of drives that are expensive but have no use at the time of purchase. Thus, adding drives when they are actually needed to satisfy the increasing demand of the storage space may significantly reduce the overall cost of the disk drives. Meanwhile, the efficiency of the use of the drives may be substantially improved.

Figure 4:
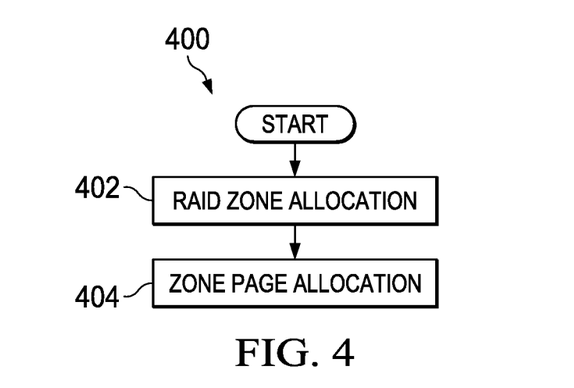
FIG. 4 illustrates a flow chart of an example method for zone and page allocation, in accordance with embodiments of the present disclosure.

FIG. 4 illustrates a flow chart of an example method 400 for zone and page allocation, in accordance with embodiments of the present disclosure. According to some embodiments, method 400 may begin at step 402. As noted above, teachings of the present disclosure may be implemented in a variety of configurations of environment 102. As such, the preferred initialization point for method 400 and the order of the steps comprising method 400 may depend on the implementation chosen.

Method 400 may be used and may be most advantageous when used in connection with SMR disks. In some embodiments, method 400 may be used in conjunction with a host-managed SMR disk system, in which a disk drive system 100 may include disk drives 108 which comprise SMR disks, and which I/O initiators executing on information handling systems 101 provide strict sequential I/O write streams to disk drive system 100.

Figure 5:
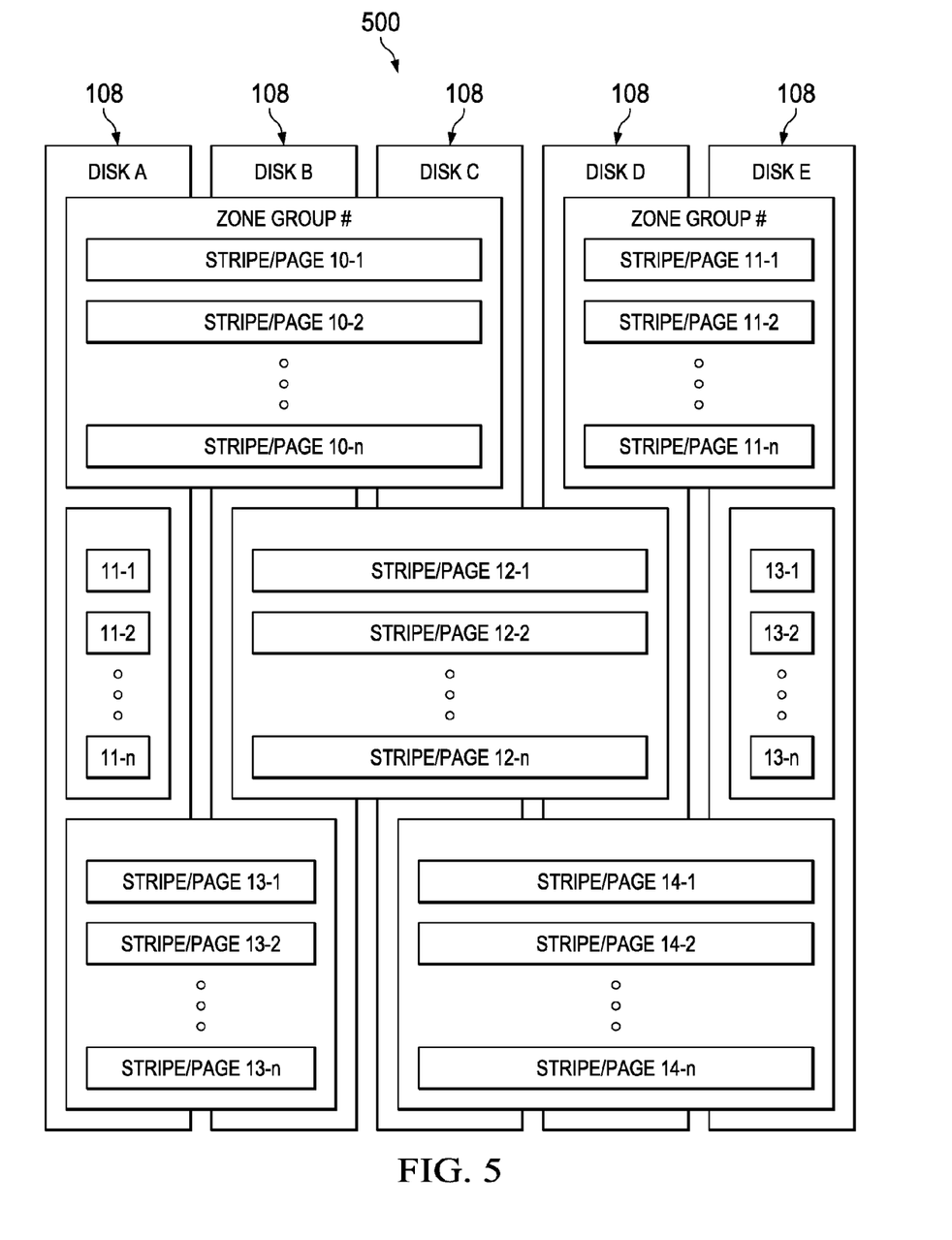
FIG. 5 illustrates a block diagram of an example data storage architecture for a RAID zone alignment, in accordance with the embodiments of the present disclosure.

At step 402, disk manager 106 may perform RAID zone alignment in order to align pages on disk drives 108 comprising SMR disks for allocation. Thus, RAID zone alignment may create RAID space in which stripes/pages align to zone boundaries on such SMR disks. A pictorial example of RAID zone alignment is shown in FIG. 5, which is described in greater detail below.

Figure 6:
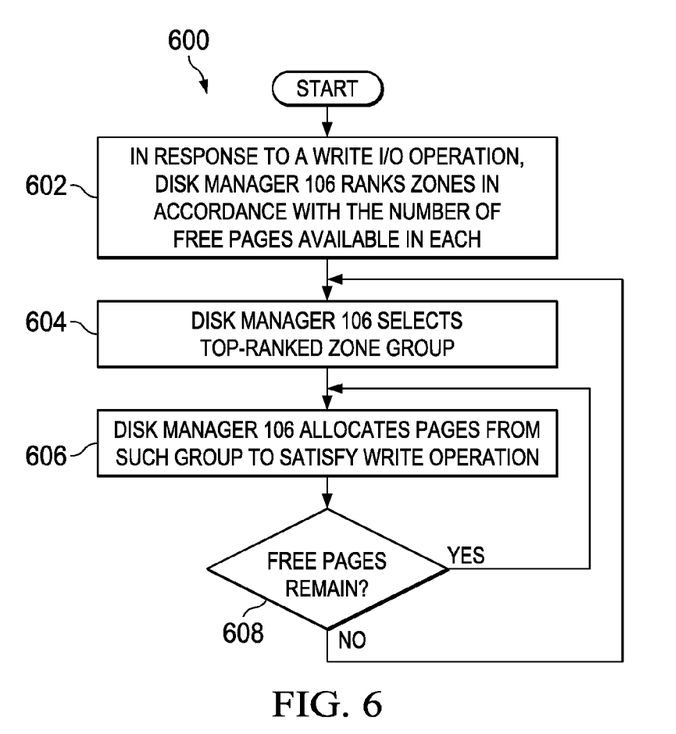
FIG. 6 illustrates a flow chart of an example method of zone identification for a page write, in accordance with embodiments of the present disclosure.

At step 404, after completion of RAID zone alignment, disk manager 106 may perform zone page allocation to control flow of page writes to disk drives 108. Thus, zone page allocation manages page allocations in order to group writes together. A flow chart for an example method of zone page allocation is shown in FIG. 6, which is described in greater detail below.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using environment 102 or any other system operable to implement method 400. In certain embodiments, method 400 may be implemented partially or fully in software and/or firmware embodied in computer-readable media (e.g., software and/or firmware embodying disk manager 106).

In performing RAID zone alignment, disk manager 106 may manage RAID space on disk drives 108 comprising SMR disks to allow page pool 112 to identify pages using the same disk zone. As described below, disk manager 106 may adjust a stripe size attribute and a repeat factor attribute to allocate pages in a manner such that zones may be written in a coordinated manner. RAID zone alignment may also enable wide striping by using available disks and striping across them.

FIG. 5 illustrates a block diagram of an example data storage architecture 500 for a RAID zone alignment, in accordance with the embodiments of the present disclosure. In existing RAID allocations, a disk manager may place sequentially numbered stripes/pages on a different set of disks. However, using RAID zone alignment as shown in FIG. 5, disk manager 106 may create zones (e.g. zones 10, 11, 12, 13, and 14) where a number of sequential stripes (e.g., stripes 10-1 to 10-*n*, 11-1 to 11-*n*, 12-1 to 12-*n*, 13-1 to 13-*n*, 14-1 to 14-*n*) lay out sequentially on SMR disk drives 108 to fill a zone. Disk manager 106 may then manage page allocations from page pool 112 knowing that a range of pages is within a single SMR zone. Each zone 10, 11, 12, 13, and 14 may start at a physical disk boundary and may also start and end at logical disk boundaries. Within a zone, disk manager 106 may fill the zone in accordance with a stripe/page size attribute and a repeat factor attribute, as described below. Sequentially, stripes may consume a disk zone before moving to the next zone. The repeat factor attribute may cause disk manager 106 to place sequentially numbered stripes (thus pages) on the same set of disks until the end of the zone is reached. Using the repeat factor attribute in this manner may allow page pool 12 to easily determine the number of pages in a single zone via a logical block address. Using a repeat factor attribute may be preferable to determining physically adjacent pages using an algorithm.

The repeat factor attribute for a zone may be determined using the zone size and segment size, wherein repeat factor=zone size/segment size. A segment size may be an amount of RAID space of a single stripe. For example, for a RAID 6 stripe of 2 MB, a segment size may be 256 KB.

Pages of page pool 112 may be aligned to RAID stripes for read and write efficiency. Thus, each RAID page (e.g., each RAID 5 or RAID 6 page) may correspond to a single RAID stripe which may allow RAID to execute a full stripe write (calculate parity across the stripe and write the data without any read operations) when entire pages are written as happens during data progression.

For wide striping, RAID zone alignment may use all disks 108. Zones may be laid out to use all disks 108.

By placing sequential pages on the same logical disk, disk manager 106 may enhance write performance of data progression in SMR disks. While bandwidth limitations of the disks may limit performance, sequential access may provide significant benefit in the case of SMR disks.

Figure 7:
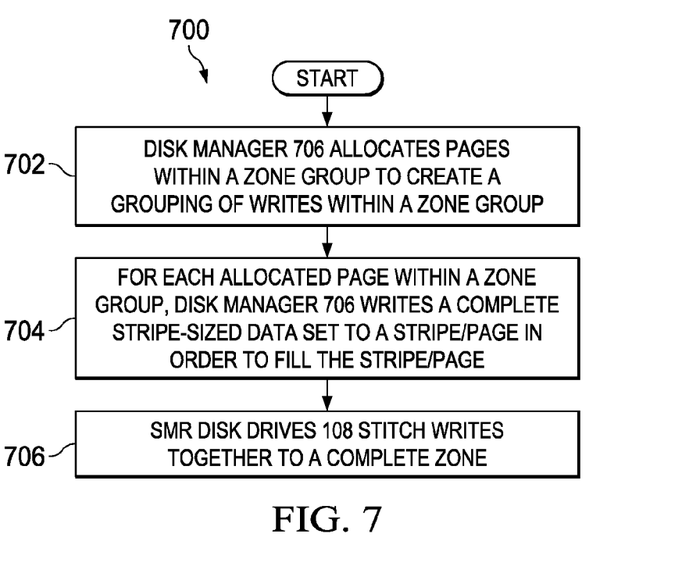
FIG. 7 illustrates a flow chart of an example method of allocation and writing of pages in a zone, in accordance with embodiments of the present disclosure.

Zone page allocation by disk manager 106 may include two processes. The first process may identify a zone for a page write and the second process may perform page allocations and writes of a zone. Zone page allocation may control page allocation sequencing by directing write traffic to a limited set of zones, as described in greater detail below. Zone page allocation may operate during initial write of a storage system where the majority of space is being allocated for the first time, and also in steady state where pages may be freed from volumes or point-in-time copies in a snapshot-based storage system.

FIG. 6 illustrates a flow chart of an example method 600 of zone identification for a page write, in accordance with embodiments of the present disclosure. According to some embodiments, method 600 may begin at step 602. As noted above, teachings of the present disclosure may be implemented in a variety of configurations of environment 102. As such, the preferred initialization point for method 600 and the order of the steps comprising method 600 may depend on the implementation chosen.

At step 602, disk manager 106 may, in response to a write I/O operation, rank the various zones (e.g., zones 10, 11, 12, 13, 14) in accordance with the number of free pages available in each. At step 604, disk manager 106 may select the top-ranked zone. At step 606, disk manager 106 may allocate pages from such group to satisfy the write operation. At step 608, disk manager 106 may determine after each page allocation if free pages remain. If no free pages remain, method 600 may proceed again to step 604, where the next-highest ranking zone may be selected. Otherwise, method 600 may return to step 606. Method 600 may execute as long as needed to allocate sufficient pages responsive to the write operation.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using environment 102 or any other system operable to implement method 600. In certain embodiments, method 600 may be implemented partially or fully in software and/or firmware embodied in computer-readable media (e.g., software and/or firmware embodying disk manager 106).

By writing to a zone with the maximum number of free pages, disk manager 106 may minimize the write amplification within a logical disk, and may also allow for effective usage of random write zones within a logical disk. During such a write, the unmodified pages within a zone may be read from the original data and combined with newly-written pages. SMR disk behavior may determine the amount of existing data moved to perform a zone modification operation, and this step of zone page allocation may determine how to move the least amount of data. In other words, ranking zones by the number of free pages and selecting the top-ranked zone may cause the least number of zones to be modified.

FIG. 7 illustrates a flow chart of an example method of allocation and writing of pages in a zone, in accordance with embodiments of the present disclosure. According to some embodiments, method 700 may begin at step 702. As noted above, teachings of the present disclosure may be implemented in a variety of configurations of environment 102. As such, the preferred initialization point for method 700 and the order of the steps comprising method 700 may depend on the implementation chosen.

At step 702, disk manager 106 may allocate pages within a zone so as to create a grouping of writes within a zone. Writes may not need to be in sequential order. Pages allocated may originate from multiple controllers and may be written in a random order. In particular, with host-aware SMR, the writes may not be required to be in a strict sequential order.

At step 704, disk manager 106 may, for each allocated page within a zone, write a complete stripe-sized data set to a stripe/page in order to fill the stripe/page.

At step 706, SMR disk drives 108 may stitch writes together to a complete zone and move the data from the random access portion to a non-random zone for storage. Once complete, a fully allocated and written set of data may fill a zone. Thus, zone page allocation may take advantage of random writes and allow writes to a single zone from multiple controllers. In other words, zone page allocation may allow for page allocations without consideration of the initiating I/O controller, and thus may open a minimal number of zones for writes.

Although FIG. 7 discloses a particular number of steps to be taken with respect to method 700, method 700 may be executed with greater or fewer steps than those depicted in FIG. 7. In addition, although FIG. 7 discloses a certain order of steps to be taken with respect to method 700, the steps comprising method 700 may be completed in any suitable order.

Method 700 may be implemented using environment 102 or any other system operable to implement method 700. In certain embodiments, method 700 may be implemented partially or fully in software and/or firmware embodied in computer-readable media (e.g., software and/or firmware embodying disk manager 106).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
creating a plurality of zones in a storage system comprising a plurality of physical disks that include shingled media recording (SMR) disks, each zone comprising a plurality of stripes, each of the plurality of stripes being striped across all of the physical disks within a logical disk comprising the zone; and
managing pages of write input/output operations in order to group pages of write input/output operations together within the plurality of stripes of a zone, wherein the managing includes ranking the plurality of zones by respective numbers of free pages within each zone, determining a stripe size for a top-ranked zone having a highest ranking to allocate pages such that consecutive write input/output operations are laid out sequentially on the SMR disks, and directing the write input/output operations to the top-ranked zone according to the determined stripe size.

2. The method of claim 1, wherein each zone starts and ends at logical disk boundaries of a respective logical disk comprising the zone.

3. The method of claim 1, wherein managing pages of write input/output operations comprises writing pages of a write input/output operation in sequential stripes of the plurality of stripes of a single zone.

4. The method of claim 1, wherein managing pages of write input/output operations comprises selecting a zone of the plurality of zones having a greatest number of free stripes for writing pages of a write input/output operation to the stripes thereof.

5. The method of claim 1, wherein managing pages of write input/output operations comprises allocating each page of a write input/output operation to a respective stripe of a zone.

6. The method of claim 5, further comprising writing a complete stripe-sized data set to the respective stripe in order to fill the stripe.

7. The method of claim 1, wherein managing pages of write input/output operations further includes adjusting a repeat factor attribute.

8. A disk drive system, comprising:
a RAID subsystem comprising a pool of storage; and a disk manager having at least one disk storage system controller configured to:
    create a plurality of zones in the pool of storage, each zone comprising a plurality of stripes, each of the plurality of stripes being striped across all of the physical disks within a logical disk comprising the zone, the physical disks including shingled media recording (SMR) disks; and
    manage pages of write input/output operations in order to group pages of write input/output operations together within the plurality of stripes of a zone, wherein the managing includes ranking the plurality of zones by respective numbers of free pages within each zone, determining a stripe size for a top-ranked zone having a highest ranking to allocate pages such that consecutive write input/output operations are laid out sequentially on the SMR disks, and directing the write input/output to the top-ranked zone according to the determined stripe size.

9. The disk drive system of claim 8, wherein each zone starts and ends at logical disk boundaries of a respective logical disk comprising the zone.

10. The disk drive system of claim 8, wherein managing pages of write input/output operations comprises writing pages of a write input/output operation in sequential stripes of the plurality of stripes of a single zone.

11. The disk drive system of claim 8, wherein managing pages of write input/output operations comprises selecting a zone of the plurality of zones having a greatest number of free stripes for writing pages of a write input/output operation to the stripes thereof.

12. The disk drive system of claim 8, wherein managing pages of write input/output operations comprises allocating each page of a write input/output operation to a respective stripe of a zone.

13. The disk drive system of claim 12, wherein the disk manager is further configured to write a complete stripe-sized data set to the respective stripe in order to fill the stripe.

14. The disk drive system of claim 8, wherein managing pages of write input/output operations further includes adjusting a repeat factor attribute.

15. An article of manufacture comprising:
a non-transitory computer-readable medium; and
computer-executable instructions carried on the computer-readable medium, the instructions readable by a processor, the instructions, when read and executed, for causing the processor to:
    create a plurality of zones in a storage system comprising a plurality of physical disks that include shingled media recording (SMR) disks, each zone comprising a plurality of stripes, each of the plurality of stripes being striped across all of the physical disks within a logical disk comprising the zone; and
    manage pages of write input/output operations in order to group pages of write input/output operations together within the plurality of stripes of a zone, wherein the managing includes ranking the plurality of zones by respective numbers of free pages within each zone, determining a stripe size for a top-ranked zone having a highest ranking to allocate pages such that consecutive write input/output operations are laid out sequentially on the SMR disks, and directing the write input/output operations to the top-ranked zone according to the determined stripe size.

16. The article of claim 15, wherein each zone starts and ends at logical disk boundaries of a respective logical disk comprising the zone.

17. The article of claim 15, wherein managing pages of write input/output operations comprises writing pages of a write input/output operation in sequential stripes of the plurality of stripes of a single zone.

18. The article of claim 15, wherein managing pages of write input/output operations comprises selecting a zone of the plurality of zones having a greatest number of free stripes for writing pages of a write input/output operation to the stripes thereof.

19. The article of claim 15, wherein managing pages of write input/output operations comprises allocating each page of a write input/output operation to a respective stripe of a zone.

20. The article of claim 19, the instructions for further causing the processor to write a complete stripe-sized data set to the respective stripe in order to fill the stripe.

21. The article of claim 15, wherein managing pages of write input/output operations further includes adjusting a repeat factor attribute.

* * * * *